United States Patent
Kano

(10) Patent No.: US 8,849,055 B2
(45) Date of Patent: Sep. 30, 2014

(54) IMAGE PROCESSING APPARATUS AND METHOD

(75) Inventor: Akira Kano, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 95 days.

(21) Appl. No.: 13/612,085

(22) Filed: Sep. 12, 2012

(65) Prior Publication Data

US 2013/0076938 A1 Mar. 28, 2013

(30) Foreign Application Priority Data

Sep. 26, 2011 (JP) .................................. 2011-209786
Sep. 4, 2012 (JP) .................................. 2012-194244

(51) Int. Cl.
G06K 9/40 (2006.01)
H04N 1/409 (2006.01)
H04N 1/58 (2006.01)

(52) U.S. Cl.
CPC ............... *H04N 1/4097* (2013.01); *H04N 1/58* (2013.01); *H04N 1/409* (2013.01)
USPC .......................................... 382/260; 382/162

(58) Field of Classification Search
USPC .................. 382/162, 164, 260, 264, 274, 300
See application file for complete search history.

(56) References Cited

U.S. PATENT DOCUMENTS

| 7,990,443 B2* | 8/2011 | Katagiri et al. ................ 348/254 |
| 8,111,878 B2* | 2/2012 | Sato .............................. 382/115 |
| 8,411,326 B2* | 4/2013 | Inoue ........................... 358/3.23 |

FOREIGN PATENT DOCUMENTS

JP 3532368 5/2004

* cited by examiner

*Primary Examiner* — Phuoc Tran
(74) *Attorney, Agent, or Firm* — Cowan, Liebowitz & Latman, P.C.

(57) ABSTRACT

An image processing apparatus for performing recovery processing of correcting degradation of an image due to an aberration of an optical imaging system with respect to image data obtained by sensing an object image entering through the optical imaging system using an image sensor, comprises: a selection unit configured to select a filter to be used for recovery processing in accordance with an image sensing condition at the time of the image sensing; an image processing unit configured to perform recovery processing for the image data by using the filter selected by the selection unit; and a correction unit configured to determine a correction value based on a difference between the value of a pixel before and after recovery processing by the image processing unit, and correcting the pixel value before the recovery processing by the image processing unit using the determined correction value.

13 Claims, 15 Drawing Sheets

FIG. 4

| R | G | R | G | R | G |
|---|---|---|---|---|---|
| G | B | G | B | G | B |
| R | G | R | G | R | G |
| G | B | G | B | G | B |
| R | G | R | G | R | G |
| G | B | G | B | G | B |

UNSATURATED PIXEL
SATURATED PIXEL
IMAGE RECOVERY FILTER

SATURATED PORTION SURROUNDING REGION

F I G. 10
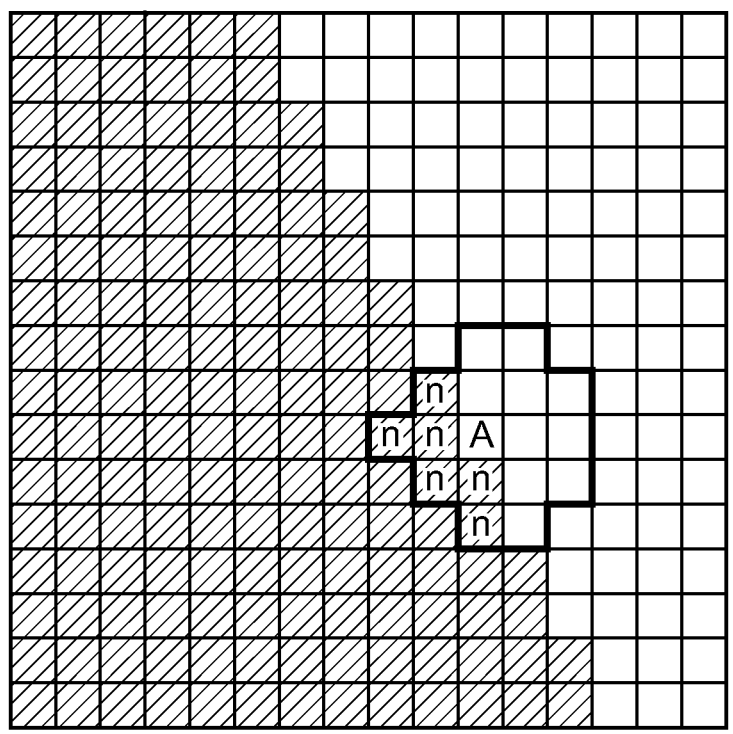

IMAGE RECOVERY FILTER

VALUE OF TAP

0

TAP

WITHOUT SATURATION
(BEFORE RECOVERY)

WITHOUT SATURATION
(AFTER RECOVERY)

WITH SATURATION
(BEFORE RECOVERY)

WITH SATURATION
(AFTER RECOVERY)

IMAGE PROCESSING APPARATUS AND METHOD

BACKGROUND OF THE INVENTION

1. Field of the Invention

The present invention relates to an image processing apparatus and method and, more particularly, to an image processing apparatus and method which corrects a degraded image using image recovery processing.

2. Description of the Related Art

Since the digitization of information has allowed images to be processed as signal values, there have been proposed various correction processing methods for sensed images. When an object is sensed and imaged by a digital camera, the obtained image is degraded more or less by the aberrations of an optical imaging system, in particular.

The causes of blur components of an image include the spherical aberration, comatic aberration, curvature of field, and astigmatism of an optical system. Each of the blur components of an image due to these aberrations indicates that a light beam emerging from one point of an object is formed into an image with a spread, which should converge into one point on an imaging plane without any aberration or any influence of diffraction. This state is called a PSF (Point Spread Function) in optical terms but will be referred to as a blur component in image terms. A blur of an image may indicate a defocused image but indicates here an image blurred due to the influences of the above aberrations of the optical system even if it is in focus. In addition, color fringing on color images due to the chromatic aberration on the axis, spherical aberration of color, and comatic aberration of color of optical systems can be regarded as different ways of blurring at different wavelengths. Furthermore, color fringing in the lateral direction which are caused by the magnification chromatic aberration of the optical system can be regarded as position shifts or phase shifts due to image sensing magnification differences for the respective wavelengths of light.

The OTF (Optical Transfer Function) obtained by Fourier transform of a PSF is frequency component information of an aberration, which is expressed by a complex number. The absolute value of an OTF, that is, an amplitude component, is called an MTF (Modulation Transfer Function), and a phase component is called a PTF (Phase Transfer Function). That is, an MTF and PTF are respectively the frequency characteristics of an amplitude component and phase component of an image degradation due to aberrations. In this case, a phase component is represented as a phase angle by equation (1):

$$PTF = \tan^{-1}(Im(OTF)/Re(OTF)) \qquad (1)$$

where Re(OTF) and Im(OTF) respectively represent the real part and imaginary part of the OTF.

As described above, the OTF of an optical imaging system causes degradations in the amplitude component and phase component of an image. For this reason, a degraded image asymmetrically blurs at each point of the object like a comatic aberration.

As a method of correcting degradations in amplitude (MTF) and phase (PTF), a method of correcting them by using the information of the OTF of an optical imaging system is known. This method is called by the terms "image recovery" and "image restoration". The processing of correcting a degradation in image by using the information of the OTF of an optical imaging system will be referred to as image recovery processing or recovery processing.

The following is an outline of image recovery processing. Letting g(x, y) be a degraded image, f(x, y) be the original image, and h(x, y) be the PSF obtained by inverse Fourier transform of the optical transfer function, equation (2) given below holds:

$$g(x,y) = h(x,y) * f(x,y) \qquad (2)$$

where * represents convolution and (x, y) represents coordinates on the image.

When this equation is converted into a display form on a frequency plane by Fourier transform, it becomes a form of product for each frequency as represented by equation (3):

$$G(u,v) = H(u,v) \cdot F(u,v) \qquad (3)$$

where H is the function obtained by Fourier transform of a PSF, and hence represents an OTF, and (u, v) represents coordinates on a two-dimensional frequency plane, that is, a frequency.

That is, in order to obtain the original image from the sensed degraded image, both sides of equation (3) may be divided by H as represented by equation (4) given below.

$$G(u,v)/H(u,v) = F(u,v) \qquad (4)$$

Returning F(u, v) to a real plane by inverse Fourier transform can obtain the original image f(x, y) as a recovered image.

Letting R be the value obtained by inverse Fourier transform of 1/H in equation (4), it is also possible to obtain the original image by performing convolution processing for an image on the real plane, as represented by equation (5):

$$g(x,y) * R(x,y) = f(x,y) \qquad (5)$$

where R(x, y) is called an image recovery filter. An actual image, however, includes noise components. For this reason, using an image recovery filter generated by taking the perfect reciprocal of the OTF in the above manner will amplify noise components together with the degraded image. In general, therefore, a proper image cannot be obtained. In this respect, for example, there is known a method of suppressing the recovery ratio on the high-frequency side of an image in accordance with the intensity ratio between an image signal and a noise signal, such as a method using a Wiener filter. As a method of correcting a degradation in the color fringing component of an image, for example, the degradation is corrected by correcting the above blur components such that the amounts of blurs are made uniform for the respective color components of the image.

In this case, since the OTF varies in accordance with image sensing conditions such as a zooming position and an aperture diameter, and hence it is necessary to change the image recovery filter used for image recovery processing accordingly.

For example, Japanese Patent No. 03532368 discloses a technique of eliminating an image blur in an endoscope for observing the interior of the living body by using a PSF corresponding to a fluorescence wavelength to be used with respect to a range outside the in-focus range of an image sensing apparatus. Since fluorescence is weak, an object optical system with a small f-number is required. This leads to a decrease in focal depth. This technique is therefore designed to obtain an in-focus image by performing image recovery processing with respect to a range in which the optical system goes out of focus.

As described above, performing image recovery processing for a sensed input image can improve image quality by correcting aberrations.

In actual image sensing operation, the sensed state of an input image sometimes does not match the state of an image recovery filter for correcting the sensed state. Consider, for example, that a sensed image has a saturated pixel. The saturated pixel has lost intrinsic object information, and hence the state of the input image does not match that of a degraded image to be processed by an image recovery filter.

When applying a filter for compensating for frequency characteristics to an image as in image recovery processing, the difference in frequency characteristic between the image and the filter may generate ringing in the image. The loss of object information due to saturation makes the saturated region of the sensed image have frequency characteristics greatly different from the intrinsic frequency characteristics of the object. A portion near the boundary between a saturated pixel and unsaturated pixel, in particular, greatly differs in frequency characteristic from the target for the image recovery filter, and hence is a region where ringing tends to occur.

Before a description of ringing generated around a saturated region, an example of an image recovery filter will be described first with reference to FIGS. 15A and 15B schematically showing the image recovery filter. It is possible to determine the number of taps of an image recovery filter in accordance with the aberration characteristics and required recovery accuracy of an optical imaging system. In the case shown in FIG. 15A, a two-dimensional filter with 11×11 taps is used. FIG. 15A omits values (coefficients) in the respective taps. FIG. 15B shows one section of this image recovery filter. The distribution of the values (coefficient values) of the respective taps of the image recovery filter serve to return the PSF, which has spatially spread due to aberrations, to ideally one original point. When using the image recovery filter, the respective taps of the filter are subjected to convolution processing (convolution integration or product sum) in accordance with the respective pixels of the image. In convolution processing, in order to improve the signal value of a given pixel, the pixel is made to coincide with the center of the image recovery filter. This technique then calculates the products of the signal values of the image and the coefficient values of the filter for the respective corresponding pixels of the image and image recovery filter, and replaces the sum total of the products with the signal value of the central pixel.

FIGS. 16A to 16D are graphs showing an example of ringing generated near a saturated portion at the time of the application of an image recovery filter. FIGS. 16A to 16D show pixel values near a given edge in a sensed image. Each abscissa represents the pixel position, and each ordinate represents the pixel value of a given color component. FIG. 16A shows a state before the application of the image recovery filter when there is no saturated pixel. Applying the image recovery filter to this image will generate a recovered image whose edge blur has been corrected, as shown in FIG. 16B. FIG. 16C shows a state before the application of the image recovery filter when saturation has occurred on the high-luminance side of the edge. Even if the image recovery filter is applied to the image in this state, since object information has been lost due to the saturation, the edge blur is not properly corrected. As a result, ringing like that shown in FIG. 16D occurs sometimes.

The conventional technique disclosed in Japanese Patent No. 03532368, however, discloses no technique of reducing ringing generated by pixel saturation.

SUMMARY OF THE INVENTION

The present invention has been made in consideration of the above situation, and reduces ringing generated in a saturated region and its surrounding region due to pixel saturation by performing image recovery processing.

The present invention in a first aspect provides an image processing apparatus for performing recovery processing of correcting degradation of an image due to an aberration of an optical imaging system with respect to image data obtained by sensing an object image entering through the optical imaging system using an image sensor, comprising: a selection unit configured to select a filter to be used for recovery processing in accordance with an image sensing condition at the time of the image sensing; an image processing unit configured to perform recovery processing for the image data by using the filter selected by the selection unit; and a correction unit configured to determine a correction value based on a difference between the value of a pixel before and after recovery processing by the image processing unit, and correcting the pixel value before the recovery processing by the image processing unit using the determined correction value.

The present invention in another aspect provides an image processing method for performing recovery processing of correcting degradation of an image due to an aberration of an optical imaging system with respect to image data obtained by sensing of an object image incident through the optical imaging system using an image sensor, comprising: a selection step of selecting a filter to be used for recovery processing in accordance with an image sensing condition at the time of the image sensing; an image processing step of performing recovery processing for the image data by using the filter selected in the selection step; and a correction step of determining a correction value based on a difference between the value of a pixel before and after recovery processing of the image processing step, and correcting the pixel value before the recovery processing of the image processing step by using the determined correction value.

Further features of the present invention will become apparent from the following description of embodiments (with reference to the attached drawings).

BRIEF DESCRIPTION OF THE DRAWINGS

The accompanying drawings, which are incorporated in and constitute a part of the specification, illustrate embodiments of the invention, and together with the description, serve to explain the principles of the invention.

FIG. 4 is a view showing an example of the color component arrangement of a RAW image;

FIG. 10 is a view for explaining a saturated portion surrounding region according to a modification;

DESCRIPTION OF THE EMBODIMENTS

Embodiments of the present invention will be described in detail in accordance with the accompanying drawings.

First Embodiment

Figure 1:
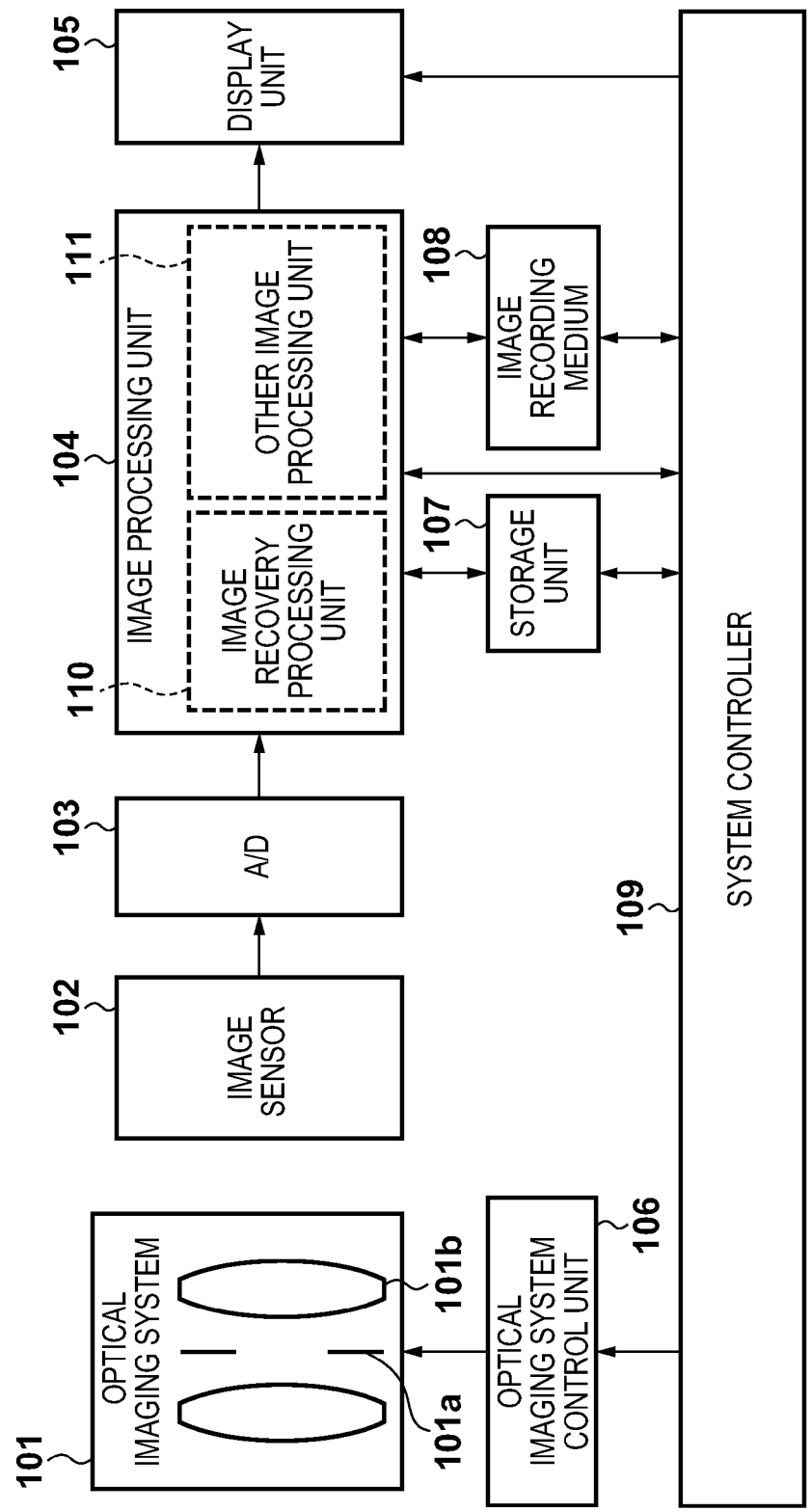
FIG. 1 is a block diagram showing the arrangement of an image sensing apparatus as an example of an image processing apparatus according to an embodiment of the present invention.

FIG. 1 is a block diagram showing an example of the basic arrangement of an image sensing apparatus according to an embodiment of the present invention. An optical imaging system 101 including a stop 101a and a focus lens 101b makes an object image (not shown) strike an image sensor 102.

An optical imaging system control unit 106 mechanically drives the optical imaging system 101 in accordance with an instruction from a system controller 109. The aperture diameter of the stop 101a is controlled as an image sensing condition setting for an f-number. An AF (AutoFocus) mechanism or a manual focusing mechanism controls the position of the focus lens 101b so as to perform focus adjustment in accordance with an object distance. This optical imaging system may include an optical element such as a low-pass filter or infrared cut filter. When using an element such as a low-pass filter which exerts an influence upon the characteristics of the OTF (Optical Transfer Function), it is necessary to consider a change in the OTF due to the optical element at the time of generating an image recovery filter. An infrared cut filter also exerts an influence upon the PSFs (Point Spread Functions) in RGB channels which are integral values of the PSFs of spectral wavelengths, in particular, upon the PSF in the R channel. Therefore, a change in PSF due to the infrared cut filter is taken into consideration at the time of generating an image recovery filter.

The image sensor 102 is covered with, for example, color filters arranged in a so-called Bayer arrangement shown in FIG. 4. Each pixel constituting the image sensor 102 outputs a signal of a color component corresponding to the color of a filter, of the red (R), green (G), and blue (B) color filters, with which the pixel is covered. The object image formed on the image sensor 102 is converted into an electrical signal. An A/D converter 103 converts the signal into a digital signal and inputs it to an image processing unit 104. The image processing unit 104 is constituted by an image recovery processing unit 110 and another image processing unit 111 which performs predetermined processing. The system controller 109 controls a series of processing in the image processing unit 104.

The image processing unit 104 selects an image recovery filter corresponding to the image sensing conditions of the image sensing apparatus from a storage unit 107. The image recovery processing unit 110 applies the selected image recovery filter to the image input to the image processing unit 104. The image sensing conditions in this case are information necessary for the selection of an image recovery filter, such as the position of a zoom lens and aperture diameter. In addition, data to be held in the storage unit 107 may be information concerning the OTF required to generate an image recovery filter instead of an image recovery filter. In this case, the image recovery processing unit 110 selects information concerning an OTF corresponding to an image sensing condition from the storage unit 107, and generates an image recovery filter corresponding to an image sensing state. The image recovery processing unit 110 then performs image recovery processing for the image input to the image processing unit 104. Specific processing contents performed in the image recovery processing unit 110 will be described later. Subsequently, the other image processing unit 111 generates an image file such as a JPEG file by performing predetermined image processing such as gamma correction processing, color balance adjustment processing, and edge enhancement processing.

The system controller 109 stores the output image processed by the image processing unit 104 in an image recording medium 108 in a predetermined format. In addition, a display unit 105 displays the image obtained by performing predetermined processing for display with respect to the image having undergone the image recovery processing. Note that the display unit 105 may display an image which has undergone no image recovery processing or has undergone simple recovery processing.

The above is an example of the basic arrangement of the image sensing apparatus according to the embodiment of the present invention. In this case, the optical imaging system 101 is configured as part of the image sensing apparatus, but may be replaceable as in a single-lens reflex camera.

Figure 2:
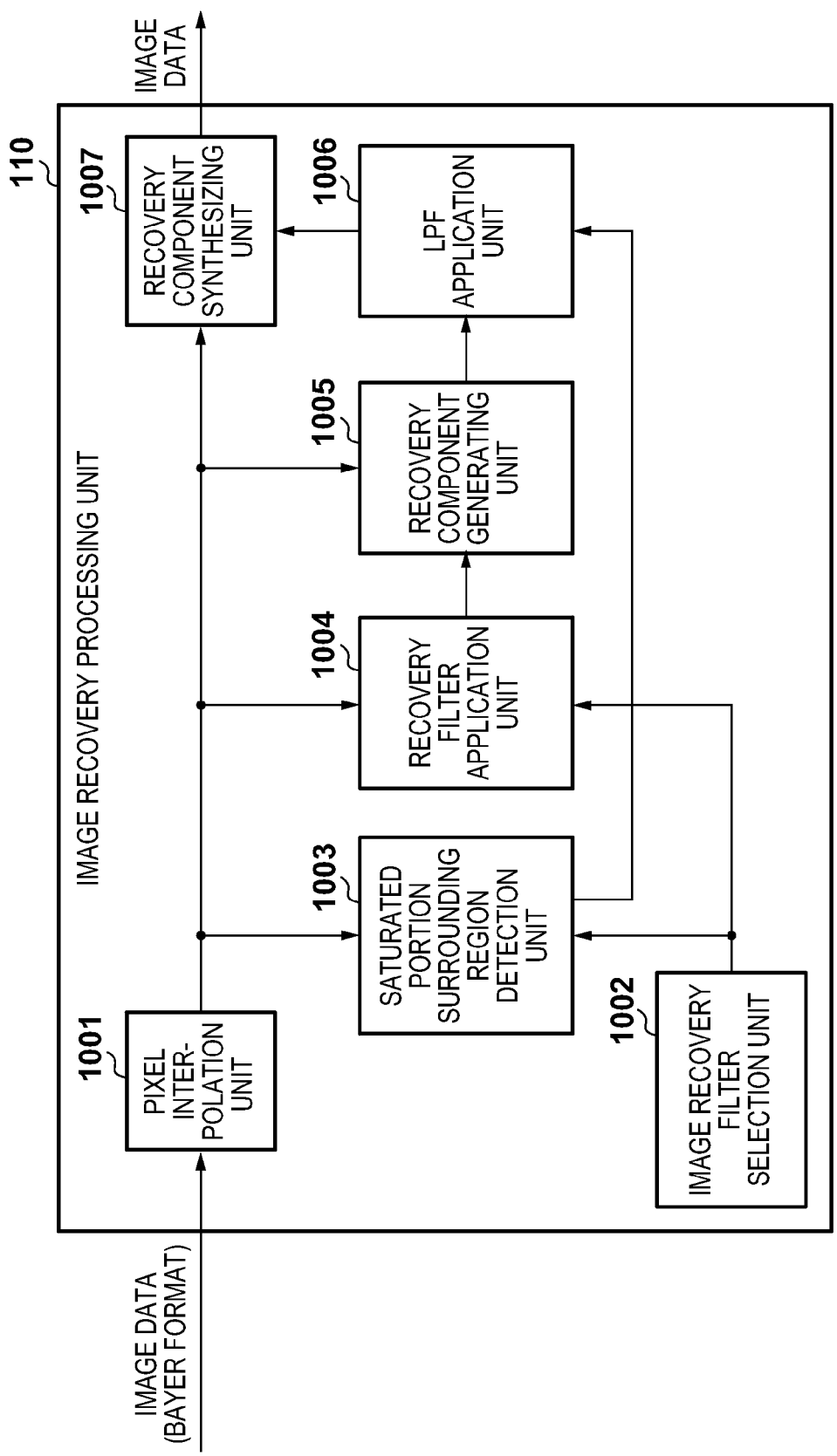
FIG. 2 is a block diagram showing the arrangement of an image recovery processing unit according to a first embodiment.
Figure 3:
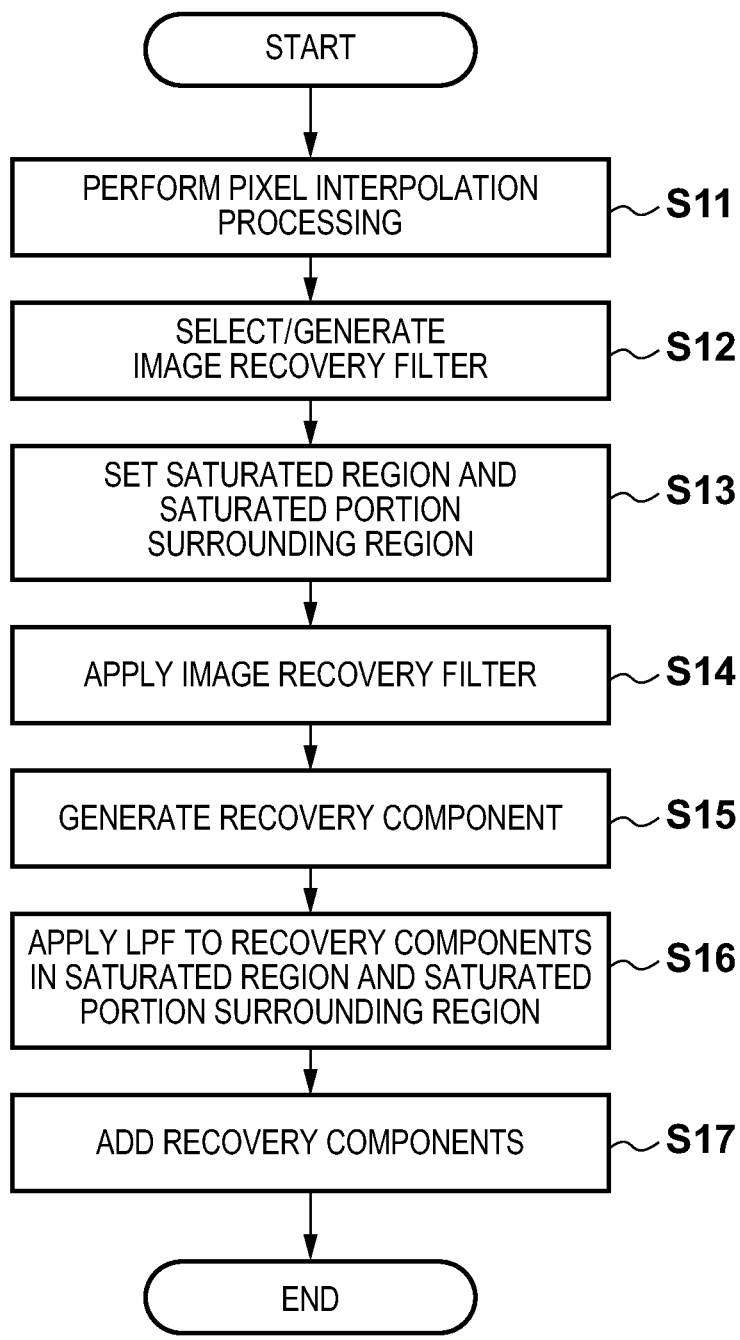
FIG. 3 is a flowchart for image recovery processing according to the first embodiment.

Image recovery processing in the first embodiment will be described in detail next with reference to FIG. 2 showing the basic arrangement of the image recovery processing unit 110 and FIG. 3 showing a flowchart for processing. As described above, the system controller 109 controls the processing in the image recovery processing unit 110 which will be described below.

Note that applying image recovery processing to an image can correct chromatic aberration due to an image forming position shift for each color while improving the sharpness of the image. For this reason, applying image recovery processing to the image having undergone edge enhancement processing and chromatic aberration correction processing will unnaturally enhance an edge, cause an image forming position shift for each color, and generate false colors.

For this reason, the image sensing apparatus of the first embodiment reads out an image before it has undergone edge enhancement processing or chromatic aberration correction processing when applying image recovery processing to the image, and applies image recovery processing to the readout image. It is possible to perform image processing for canceling edge enhancement processing or chromatic aberration correction processing instead of reading out an image before it has undergone edge enhancement processing or chromatic aberration correction processing. Alternatively, it is possible to display a warning to the user to cancel edge enhancement processing or chromatic aberration correction processing and apply image recovery processing for the image after such processing is canceled.

Note that since the image to which the image recovery processing is applied has already undergone correction of an image forming position shift for each color, the image processing unit 104 inhibits the execution of chromatic aberration correction processing for the image. If, therefore, the other image processing unit 111 has a function of chromatic aberration correction processing, the other image processing unit 111 executes chromatic aberration correction processing for only an image to which image recovery processing has not been applied. Note that in order to meet the user's requirement to obtain an image with enhanced sharpness, the other image processing unit 111 can apply edge enhancement processing to an image to which image recovery processing has been applied.

An input to the image recovery processing unit 110 is a RAW image in a Bayer arrangement with each pixel having one color component shown in FIG. 4, as described above. For this reason, first of all, the image recovery processing unit 110 causes a pixel interpolation unit 1001 to perform pixel interpolation processing to make each pixel have color component signals corresponding to all the filter colors, thereby generating three color planes, that is, R, G, and B planes (step S11).

An image recovery filter selection unit 1002 then selects an image recovery filter suitable for image sensing conditions at the time of image sensing operation, such as a zooming position and an aperture diameter (step S12). In this case, it is possible to correct the selected image recovery filter as needed. For example, discrete image sensing condition data may be prepared to reduce the number of data of image recovery filters to be prepared in the storage unit 107. When executing image recovery processing, it is possible to correct the image recovery filter to make it suitable for an image sensing state at this time. Alternatively, it is possible to generate an image recovery filter corresponding to an image sensing state from information concerning the OTF required for the generation of an image recovery filter instead of selecting an image recovery filter.

Figure 15A:
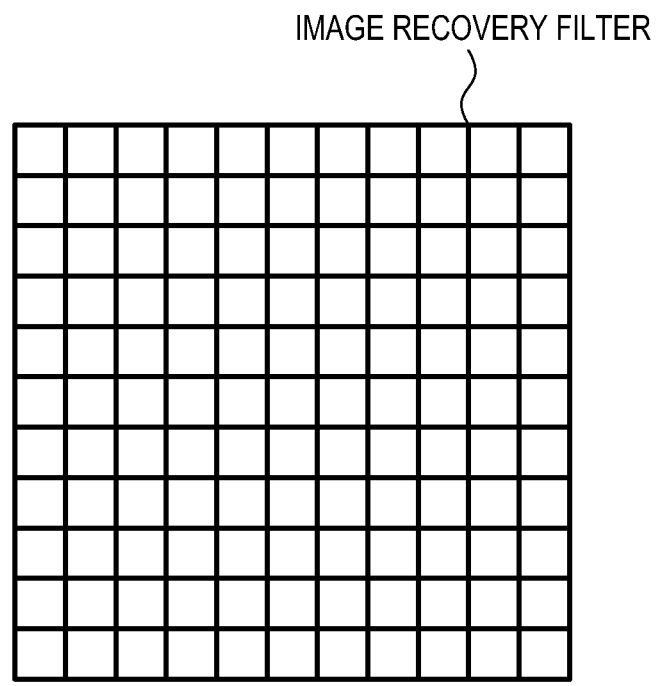
FIGS. 15A and 15B are schematic views for explaining an image recovery filter.
Figure 15B:
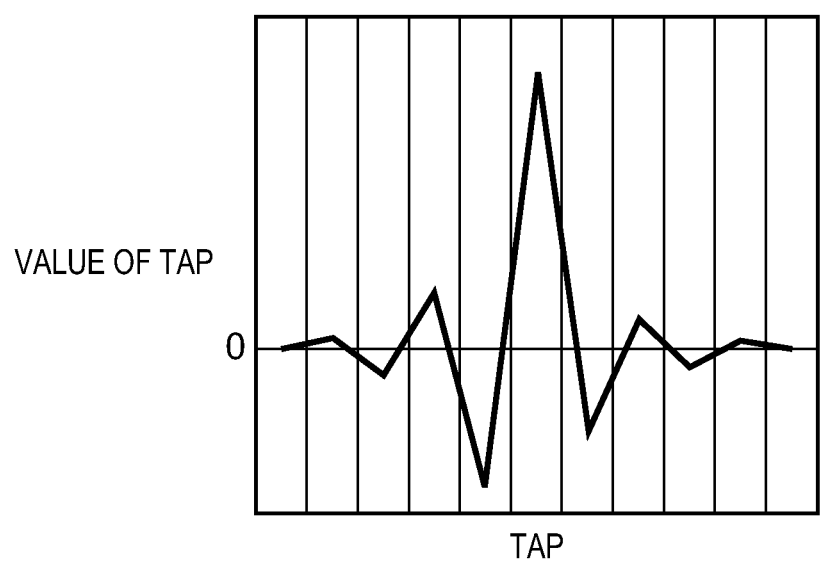
Figure 16A:
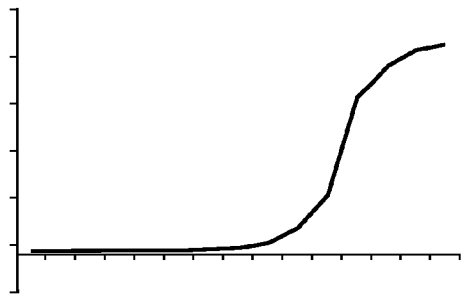
FIGS. 16A to 16D are graphs for explaining ringing.
Figure 16B:
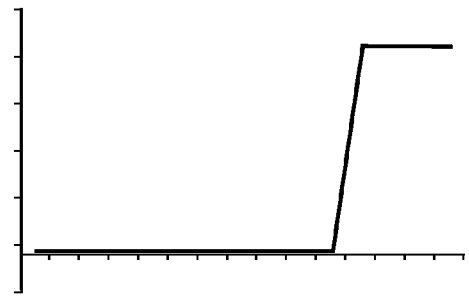
Figure 16C:
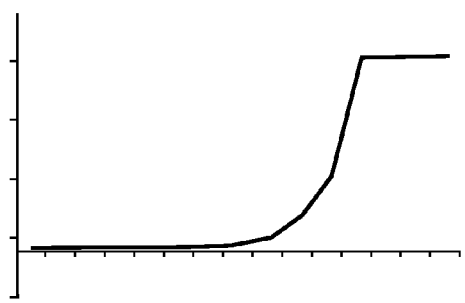
Figure 16D:
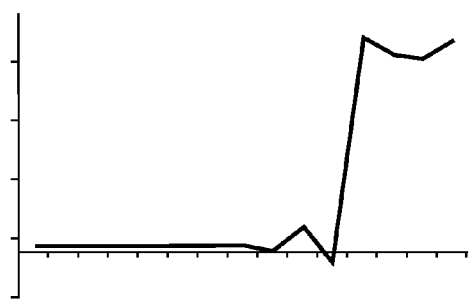

Note that as image recovery filter used in the first embodiment, it is possible to use, for example, the image recovery filter described with reference to FIGS. 15A and 15B. The image recovery filter shown in FIGS. 15A and 15B performs convolution processing in an image recovery step with each tap of the filter corresponding to one pixel of an image. As shown in FIG. 15A, using a two-dimensional filter obtained by dividing an image recovery filter into 100 or more filters can correct even aberrations widely spreading from image forming positions such as the spherical aberration, comatic aberration, chromatic aberration on the axis, off-axis color flare, and the like of the optical imaging system.

The image recovery filter shown in FIGS. 15A and 15B can be generated by calculating or measuring the OTF of an optical element of an optical imaging system, as described with reference to equations (2) and (3), and performing inverse Fourier transform of the inverse function, as described above with reference equations (4) and (5). In general, since it is necessary to consider the influences of noise, it is possible to selectively use a method of generating a Wiener filter or an associated recovery filter. In addition, an OTF can contain a factor that deteriorates the OTF with respect to not only an optical imaging system but also an image to be input. For example, a low-pass filter is used to suppress high-frequency components with respect to the frequency characteristics of the OTF. In addition, the shape and opening ratio of pixel openings of an image sensor also have influences on frequency characteristics. In addition, the spectral characteristics of a light source and the spectral characteristics of filters with various wavelengths may have influences on frequency characteristics. Accordingly, image recovery filters are generated based on OTFs in a broad sense.

A saturated portion surrounding region detection unit 1003 then sets a saturated region constituted by saturated pixels on each color plane of R, G, and B planes, and sets a saturated portion surrounding region which is a region surrounding the saturated region (step S13). Saturated pixels are determined by setting a threshold for a saturation level from the characteristics of the image sensor 102, in advance, such that each pixel having a signal value larger than the threshold is determined as a saturated pixel. The saturated portion surrounding region set in this case is a region where there is a chance that ringing will occur because the state of an input image does not match that of a degraded image as a target for an image recovery filter due to saturation. More specifically, this is a region constituted by pixels which are not saturated pixels and for which saturated pixels are used in convolution using the image recovery filter when performing image recovery processing for the unsaturated pixels. For this reason, a saturated portion surrounding region is set in accordance with the characteristics of the image recovery filter. Note that a method of setting a saturated portion surrounding region by the saturated portion surrounding region detection unit 1003 will be described in detail later.

A recovery filter application unit 1004 performs convolution processing for each pixel of each color component of the sensed image by using the image recovery filter selected in step S12 (step S14). This can correct aberration asymmetry caused in the optical imaging system or remove or reduce blur components on the image.

Figure 5A:
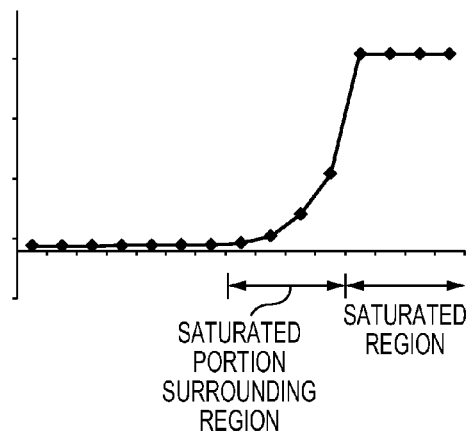
FIGS. 5A to 5E are graphs for explaining ringing reduction processing according to the first embodiment.
Figure 5B:
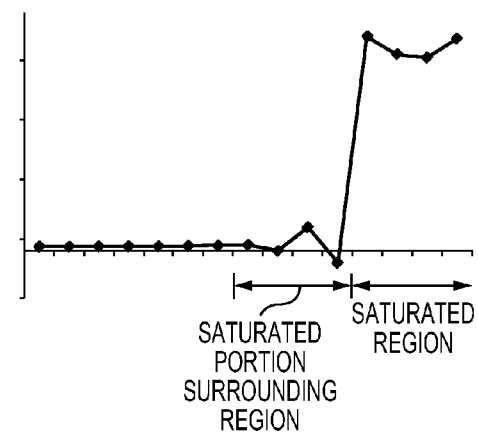

FIGS. 5A to 5E show the relationship between ringing which occurs near a saturated region due to the application of an image recovery filter, the saturated region, and a saturated portion surrounding region. FIG. 5A is a sectional view of a given edge between a saturated region and a saturated portion surrounding region before the application of an image recovery filter to one color component. FIG. 5A shows a state in which a high-luminance portion is saturated. FIG. 5B shows a state after the application of the image recovery filter. Obviously, ringing has occurred in the saturated region and the saturated portion surrounding region.

In order to correct such ringing, first of all, the recovery filter application unit 1004 applies an image recovery filter, and a recovery component generating unit 1005 then generates recovery components (step S15). In this case, as indicated by equations (6) to (8), recovery components are defined as the differences between pixel values before the application of the image recovery filter and pixel values after the application of the image recovery filter (before and after recovery processing). Note that in equations (6) to (8), Rd(x, y), Gd(x, y), and Bd(x, y) respectively represent R, G, and B recovery components, and R0(x, y), G0(x, y), and B0(x, y) represent RGB pixel values before image recovery processing. In addition, R1(x, y), G1(x, y), and B1(x, y) represent RGB pixel values after image recovery processing. Furthermore, x and y respectively represent coordinates in the lateral and longitudinal directions.

$$Rd(x,y)=R1(x,y)-R0(x,y) \qquad (6)$$

$$Gd(x,y)=G1(x,y)-G0(x,y) \qquad (7)$$

$$Bd(x,y)=B1(x,y)-B0(x,y) \qquad (8)$$

Subsequently, an LPF application unit 1006 applies a low-pass filter (LPF) to recovery components, of the acquired recovery components, which correspond to the pixels in the saturated region and saturated portion surrounding region set by the saturated portion surrounding region detection unit 1003 (step S16). Note that the LPF application unit 1006 does not apply the LPF to pixels other than those in the saturated region and the saturated portion surrounding region. A recovery component synthesizing unit 1007 synthesizes recovery components with the respective pixel values output from the pixel interpolation unit 1001 (step S17). In this case, equations (9) and (10) indicate an example of how the LPF application unit 1006 and the recovery component synthesizing unit 1007 apply the LPF to and synthesize recovery components to the pixels in the saturated region and the saturated portion surrounding region. In equation (9), Rd'(x, y) represents a recovery component after the application of the LPF. In equation (10), R2(x, y) represents an R pixel value after recovery component synthesis.

$$Rd'(x, y) = \tag{9}$$
$$\{4 \times Rd(x, y) + 2 \times (Rd(x, y-1) + Rd(x-1, y) + Rd(x+1, y) +$$
$$Rd(x, y+1)) + (Rd(x-1, y-1) + Rd(x+1, y-1) +$$
$$Rd(x-1, y+1) + Rd(x+1, y+1))\}/16$$

$$R2(x, y) = R0(x, y) + Rd'(x, y) \tag{10}$$

Although the above is an example of how image recovery processing is applied to an R component, the same processing can be applied to G and B components.

In addition, as for a region other than the saturated region and the saturated portion surrounding region, it is possible to obtain pixel values after the application of the image recovery filter by synthesizing the pixel values of the respective pixels before the application of the image recovery filter with recovery components which are the differences between pixel values before and after the application of the image recovery filter. That is, it is possible to obtain pixel values after the application of the image recovery filter according to equation (11) given below:

$$R2(x,y)=R0(x,y)+Rd(x,y) \tag{11}$$

Figure 5C:
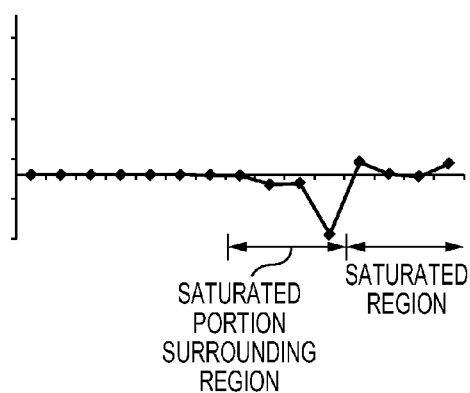
Figure 5D:
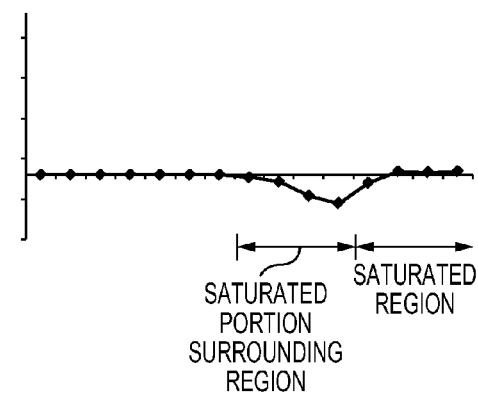
Figure 5E:
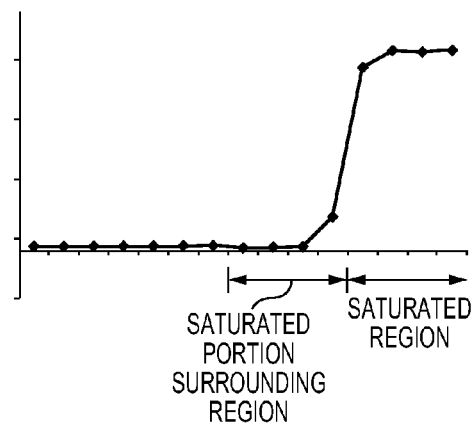

Smoothing the recovery components of the pixels in the saturated region and the saturated portion surrounding region by applying the LPF in this manner makes it possible to reduce ringing. FIG. 5C shows an example of recovery components at the edge between the saturated region and the saturated portion surrounding region before and after the application of the image recovery filter shown in FIGS. 5A and 5B. FIG. 5D shows an example of the result obtained by applying the LPF to the recovery component. FIG. 5E shows an example of the edge obtained by performing ringing reduction processing by applying the LPF to the recovery components. Obviously, as shown in FIG. 5E, the ringing is suppressed as compared with the state shown in FIG. 5B in which ringing has occurred, and the edge blur is reduced as compared with the state shown in FIG. 5A before the application of the image recovery filter.

Performing the processing in the above manner as described with reference to FIG. 3 terminates image recovery processing in the image recovery processing unit 110. Note that the characteristics of the LPF applied to recovery components described in the first embodiment are an example, and hence it is preferable to set an LPF to be used in accordance with the characteristics of an image recovery filter or the characteristics of an image.

Since the OTF changes in accordance with the angle of view (image height) of the optical imaging system even in one image sensing state, it is preferable to perform the image recovery processing according to the present invention upon changing the OTF for each segmented region of the image in accordance with the image height. It is preferable to scan an image recovery filter on an image while performing convolution processing and to sequentially change the filter for each area. That is, this apparatus selects or generates an image recovery filter for each pixel of each color component in step S12, and executes recovery processing for each pixel of each color component in step S14. In addition, although the application of image recovery filters is taken as image recovery processing, it is possible to take other types of processing such as distortion correction processing, peripheral light amount correction processing, and noise reduction processing before, after, and during the procedure of the present invention and handle the resultant procedure as image recovery processing.

According to the above description made with reference to FIGS. 2 and 3, the apparatus generates recovery components of pixels other than those in a saturated region and a saturated portion surrounding region and synthesizes them with the pixel values before the application of an image recovery filter. However, the present invention is not limited to this example. The present invention may output the pixel values obtained after the application of an image recovery filter without any change as the pixel values of pixels other than those in a saturated region and saturated portion surrounding region as long as it is possible to synthesize recovery components of the pixels in the saturated region and the saturated portion surrounding region, which have undergone LPF processing, with the pixel values before the application of the image recovery filter.

Figure 6:
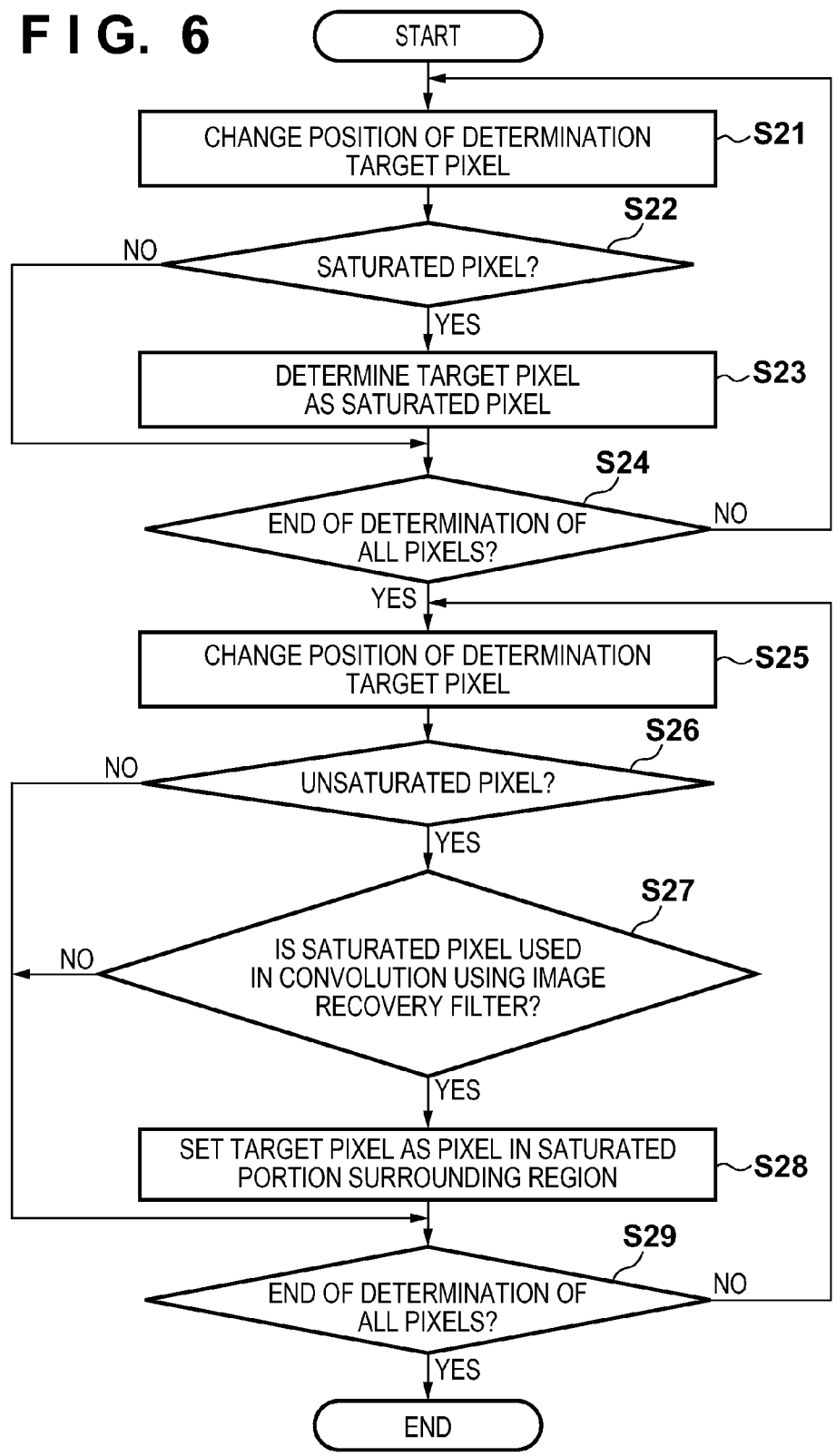
FIG. 6 is a flowchart for saturated region/saturated portion surrounding region setting processing according to the first embodiment.

A specific saturated region determination method and a specific saturated portion surrounding region setting method in step S13 will be described in detail next with reference to FIG. 6. Steps S21 to S24 show saturated region determination processing and steps S25 to S29 show saturated portion surrounding region setting processing.

The saturated portion surrounding region detection unit 1003 decides the coordinates of a pixel to be determined whether it is a pixel in the saturated region. The determination target pixel is sequentially changed in each iteration so as to perform a determination on all the pixels (step S21). The process then determines whether the pixel value of the determination target pixel is larger than the threshold decided in accordance with the characteristics of the image sensor 102 (step S22). If the pixel value is larger than the threshold, the apparatus determines that the pixel is a saturated pixel (step S23). If the pixel value is equal to or less than the threshold, since the pixel is not a saturated pixel, the process directly advances to step S24. Note that since the coordinate information of the saturated pixel will be referred to later, the coordinate information of the pixel determined as a saturated pixel is held for a later use. The process determines whether it has performed the above saturated region determination for all the pixels (step S24). If the apparatus has not completed the processing for all the pixels, the process returns to step S21 to repeat the above processing. If the apparatus has completed the processing for all the pixels, the process advances to the saturated portion surrounding region decision processing performed next.

The process then decides the coordinates of a pixel to be determined whether it is a pixel in the saturated portion surrounding region (step S25). The determination target pixel is sequentially changed in each iteration so as to perform a determination on all the pixels. First of all, the process determines whether the determination target pixel is an unsaturated pixel (a pixel other than saturated pixels) (step S26). Referring to the saturated pixel information held in step S23 can determine whether the determination target pixel is an unsaturated pixel. If the pixel is a saturated pixel, the process advances to step S29. If the pixel is not an unsaturated pixel, the apparatus determines whether a saturated pixel/pixels will be used in convolution using an image recovery filter at the time of recovery processing for the determination target pixel (step S27). Referring to the saturated pixel information set in step S23 and the image recovery filter applied to the target pixel can determine whether a saturated pixel/pixels will be used when performing convolution using the image recovery filter. When a saturated pixel/pixels will be used, the apparatus sets the determination target pixel as a pixel in the saturated portion surrounding region (step S28). To refer to the coordinate information of each pixel in the saturated portion surrounding region later, the process holds the coordinates of each pixel determined as a pixel in the saturated portion surrounding region so as to use it later. In contrast, when no saturated pixel will be used, the process advances to step S29.

Upon performing the above saturated portion surrounding region determination for all the pixels (YES in step S29), the saturated region determination and the saturated portion surrounding region setting processing in step S13 end.

Figure 7A:
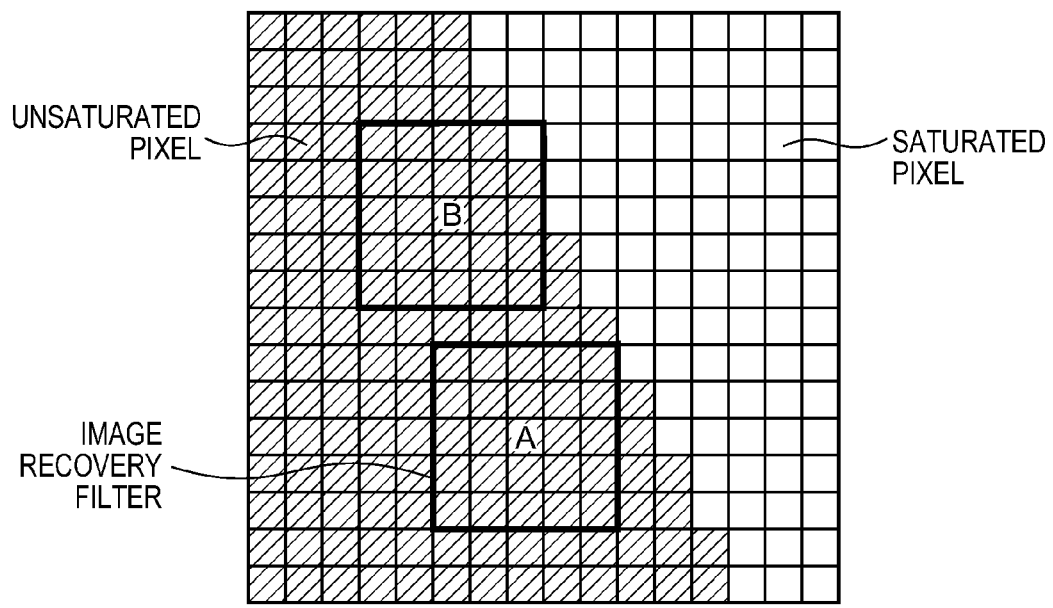
FIGS. 7A and 7B are views for explaining a saturated portion surrounding region according to the first embodiment.
Figure 7B:
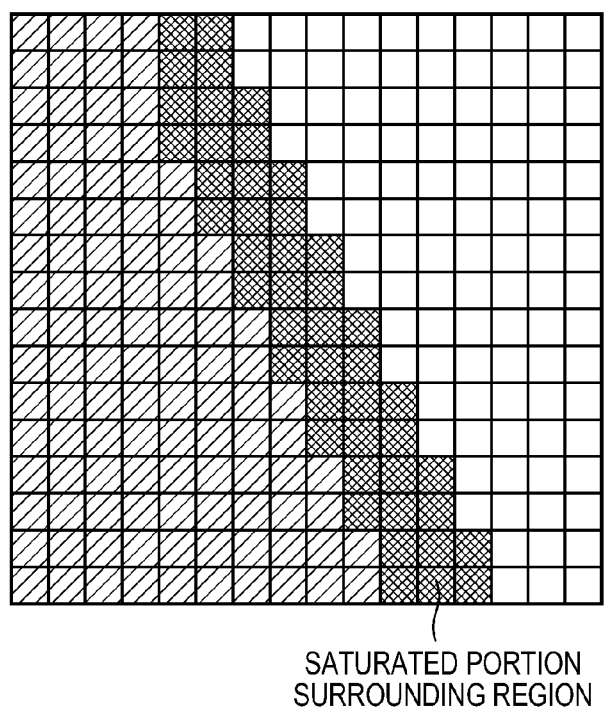

A specific example of saturated portion surrounding region determination will be further described with reference to FIGS. 7A and 7B. FIG. 7A shows a given region in the image, in which the white portion represents saturated pixels, and the remaining pixels are unsaturated pixels which are not saturated. Referring to FIG. 7A, an image recovery filter for generating a recovery signal of a pixel A is a 5×5 tap filter, which is used to perform convolution processing for the pixels in the range indicated by the thick frame around the pixel A. In the case of the pixel A, the apparatus uses no saturated pixel when applying an image recovery filter. That is, no ringing due to pixel saturation occurs, and hence the pixel A is not set as a pixel in the saturated portion surrounding region. In the case of a pixel B, the apparatus uses some saturated pixels when applying the image recovery filter. Therefore, the pixel B is set as a pixel in the saturated portion surrounding region. FIG. 7B shows an example a saturated portion surrounding region set by performing the above determination for each unsaturated pixel.

Figure 8A:
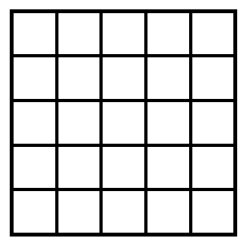
FIGS. 8A to 8C are views for explaining another saturated portion surrounding region according to the first embodiment.
Figure 8B:
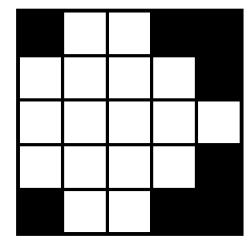
Figure 8C:
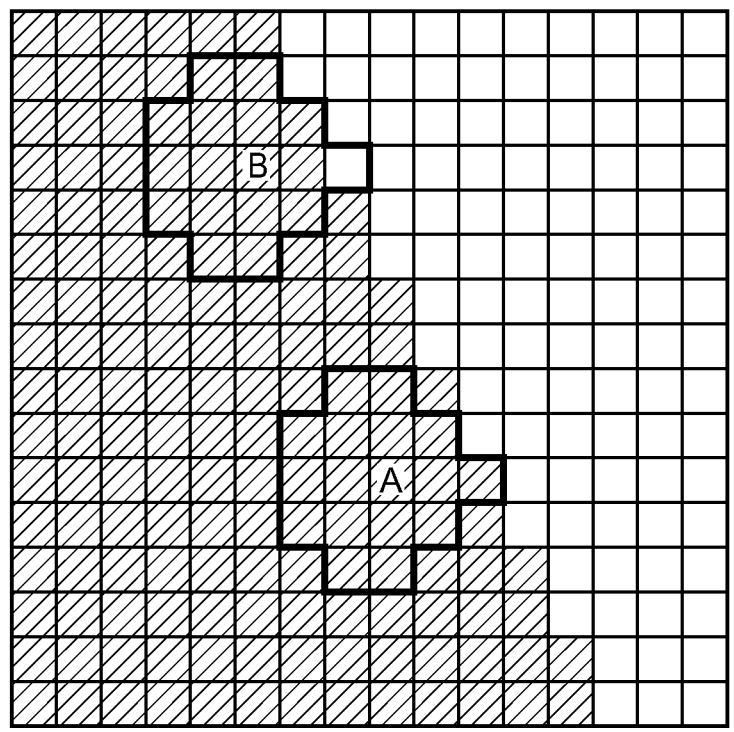

In addition, a saturated portion surrounding region may be decided in consideration of not only the number of taps of the image recovery filter shown in FIG. 7A, but also filter coefficient values instead of deciding a saturated portion surrounding region. Referring to FIG. 8B, black portions indicate part of taps whose absolute values of filter components can be regarded as 0 in the 5×5 tap image recovery filter shown in FIG. 8A without exerting almost no effect on the result of filtering process. The portions which may exert almost no effect on the result of filtering process if they are regarded as 0 are that the absolute values of coefficients are very small when compared with the maximum absolute value of a coefficient of the respective coefficients constituting the filter, and even if these portions are replaced with 0, the level of the influence of them on the pixel values generated by the application of the filter is negligible. FIG. 8C shows an example of setting a saturated portion surrounding region in consideration of only the effective coefficients represented by the white portion of the filter shown in FIG. 8B, in which a pixel A is not a pixel in the saturated portion surrounding region, and a pixel B is a pixel in the saturated portion surrounding region. Setting a saturated portion surrounding region in this manner can minimize a region for which the above ringing reduction processing is to be performed.

Modification

Figure 9:
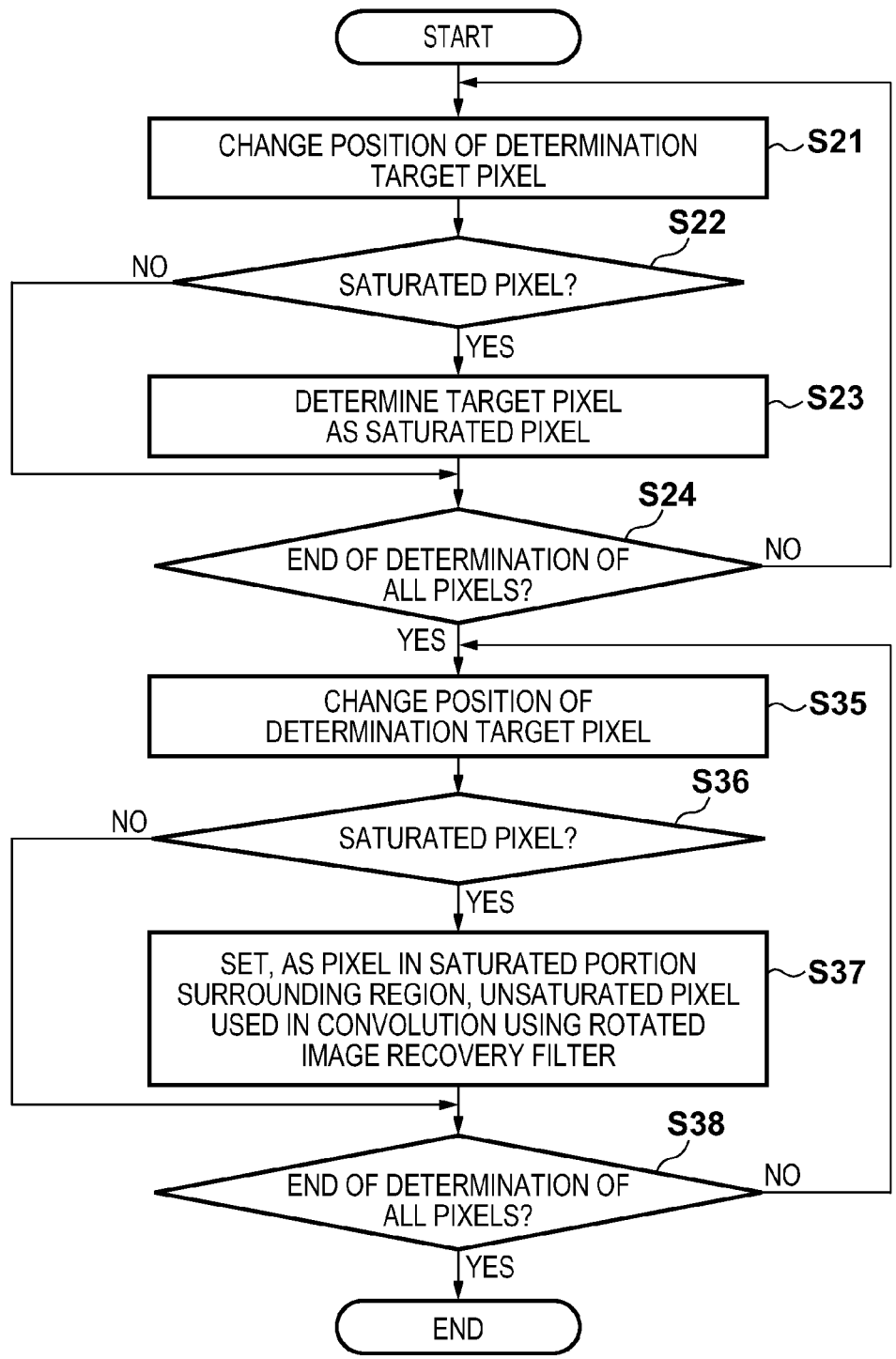
FIG. 9 is a flowchart for saturated region/saturated portion surrounding region setting processing according to a modification.

FIG. 9 is a flowchart for another method of setting a saturated portion surrounding region. Since the processing in steps S21 to S24 is the same as that in the saturated region determination processing shown in FIG. 6, a description of it will be omitted. Saturated portion surrounding region setting processing in step S35 and the subsequent steps will be described.

First of all, the process decides the coordinates of a pixel to be determined whether it is a pixel in the saturated portion surrounding region (step S35). The determination target pixel is sequentially changed to perform determination on all the pixels. The process then determines whether the determination target pixel is a saturated pixel (step S36). It is possible to discriminate whether the determination target pixel is a saturated pixel, by referring to the saturated pixel information held in step S23.

If the target pixel is a saturated pixel, the saturated portion surrounding region detection unit 1003 rotates the image recovery filter, which is to be applied when performing recovery processing for the target pixel, through 180° and decides a saturated portion surrounding region from unsaturated pixels and filter coefficients which are to be used in convolution (step S37). Referring to FIG. 10, when an image recovery filter to be applied is a filter containing effective coefficients like that shown in FIG. 8B, the thick line indicates the range of the image recovery filter obtained by rotating the effective coefficient portion of the image recovery filter to be applied to a pixel A through 180°. The apparatus sets unsaturated pixels n in this range as pixels in the saturated portion surrounding region. It is possible to obtain the same effect as that obtained by the method shown in FIG. 8C by rotating an image recovery filter to be applied to saturated pixels through 180° and setting unsaturated pixels used in convolution as pixels in the saturated portion surrounding region in this manner.

Upon performing the above saturated portion surrounding region determination for all the pixels (YES in step S38), the saturated region determination and the saturated portion surrounding region setting processing in step S13 end.

Deciding a saturated portion surrounding region from an image recovery filter to be applied to each saturated pixel in this manner can limit the execution of step S37, which is the processing for saturated portion surrounding region setting, to saturated pixels. In addition, by adding the step of deciding to skip step S37 when all the pixels adjacent to the determination target pixel are saturated even if the apparatus determines in step S36 that the determination target pixel is saturated, it is possible to perform the processing in step S37 for only a saturated pixel having at least one adjacent pixel which is an unsaturated pixel.

In a general image, the number of saturated pixels each having at least one adjacent pixel which is an unsaturated pixel is much smaller than the number of unsaturated pixel. For this reason, the method of performing saturated portion surrounding region determination for only saturated pixels can achieve a low processing load as compared with the method indicated by the flowchart of FIG. 6 which performs saturated portion surrounding region determination for all the unsaturated pixels. Since the OTF changes in accordance with the angle of view (image height) of the optical imaging system even in one image sensing state, different filters are used for different pixels. In a strict sense, therefore, an image recovery filter applied to a given saturated pixel does not match an image recovery filter applied to its surrounding pixel. However, OTFs to be used among adjacent pixels have very similar characteristics, and hence it is possible to decide a saturated portion surrounding region by using the image recovery filter applied to saturated pixels in the above manner.

Second Embodiment

Image recovery processing according to the second embodiment of the present invention will be described below.

Note that the basic arrangement of an image sensing apparatus according to the second embodiment is the same as that described with reference to FIG. 1 in the first embodiment described above. The second embodiment will exemplify a case in which it performs image recovery processing for image data in the Bayer format like that shown in FIG. 4 without performing pixel interpolation unlike the first embodiment.

Figure 11:
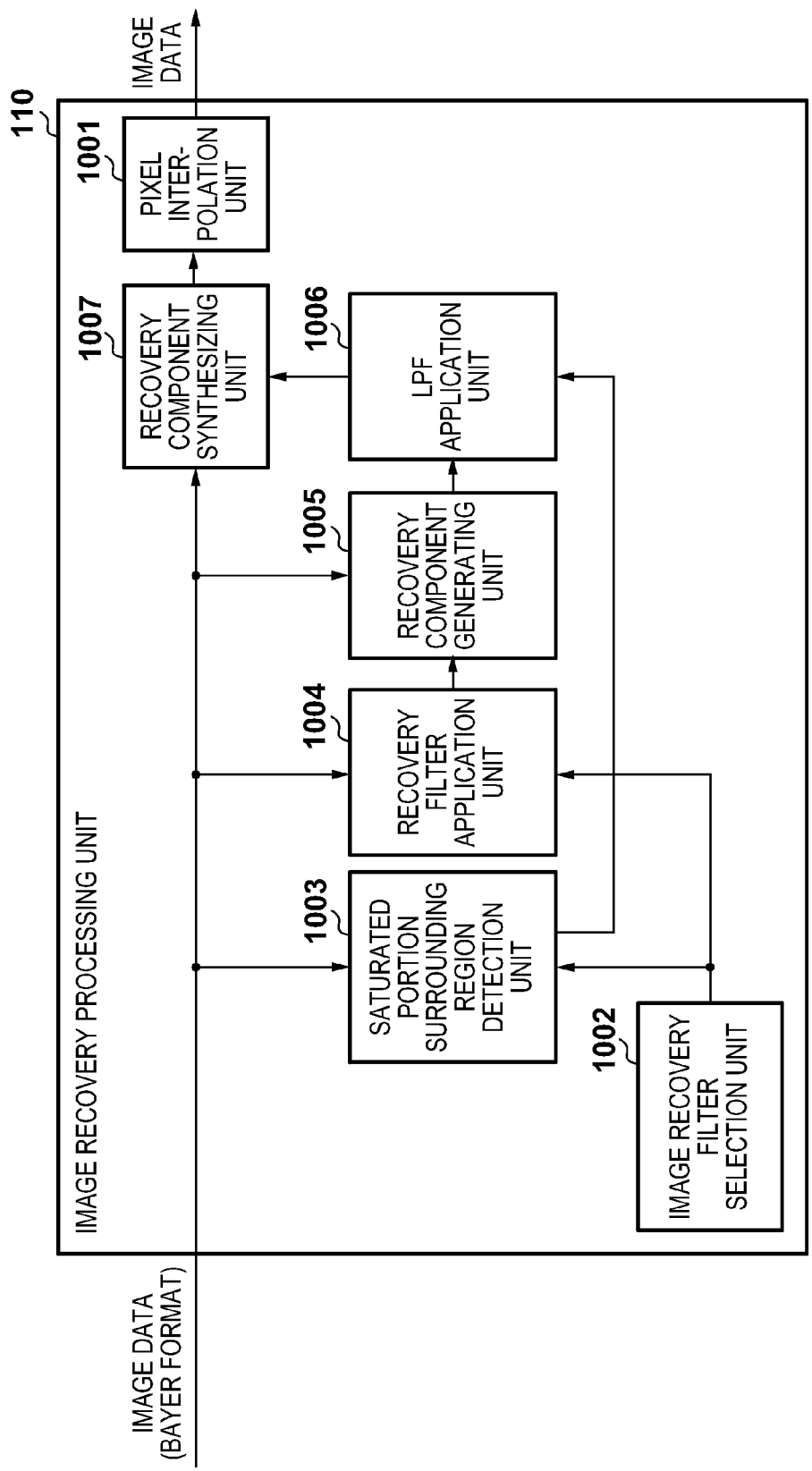
FIG. 11 is a block diagram showing the arrangement of an image recovery processing unit according to a second embodiment.
Figure 12:
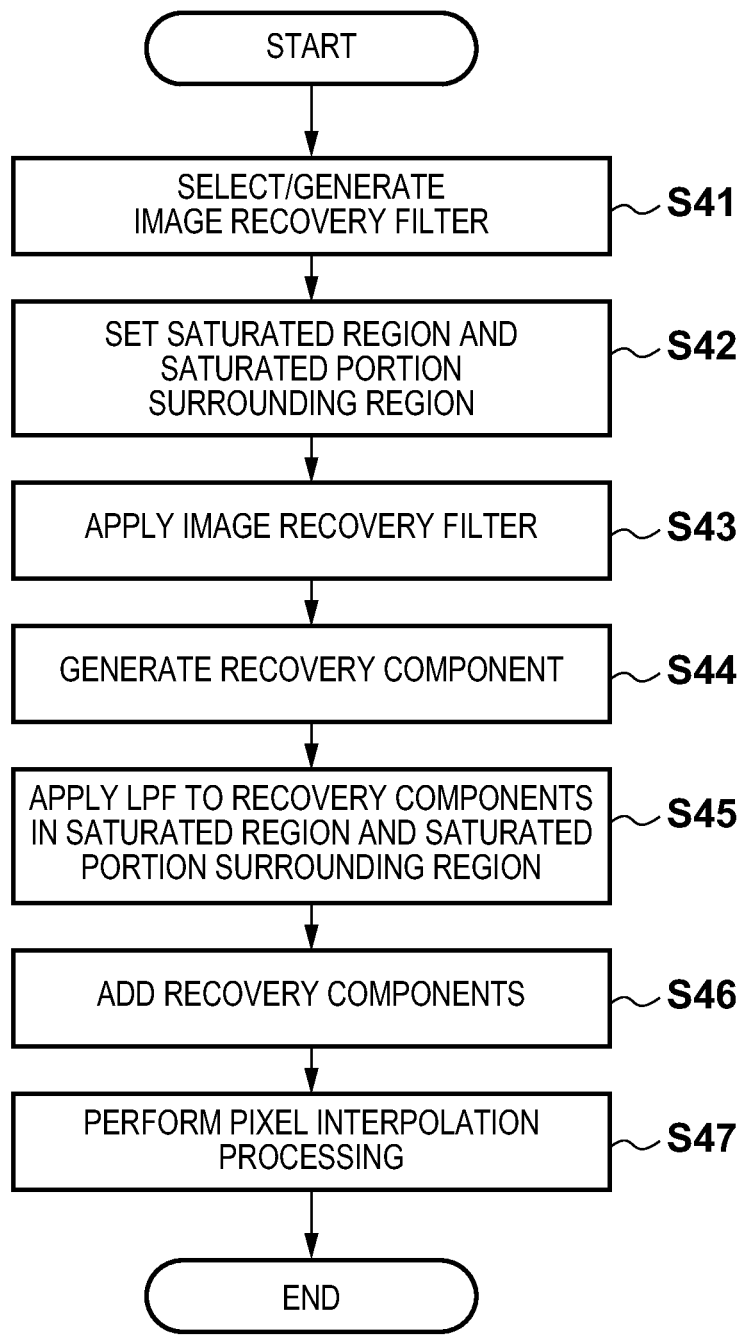
FIG. 12 is a flowchart for image recovery processing according to the second embodiment.

The details of image recovery processing in the second embodiment will be described with reference to FIG. 11 showing the basic arrangement of an image recovery processing unit 110 and FIG. 12 showing a flowchart for the processing in the second embodiment. Note that a system controller 109 controls processing in the image recovery processing unit 110. An input to the image recovery processing unit 110 is a RAW image in the Bayer format shown in FIG. 4, which has one color component for each pixel.

First of all, an image recovery filter selection unit 1002 selects an image recovery filter suitable for image sensing conditions at the time of image sensing operation, such as a zooming position and an aperture diameter (step S41). In this case, it is possible to correct the selected image recovery filter as needed. For example, discrete image sensing condition data may be prepared to reduce the number of data of image recovery filters to be prepared in the storage unit 107. When executing image recovery processing, it is possible to correct the image recovery filter to make it suitable for an image sensing state at this time. Alternatively, it is possible to generate an image recovery filter corresponding to an image sensing state from information concerning the OTF required for the generation of an image recovery filter instead of selecting an image recovery filter.

Figure 13A:
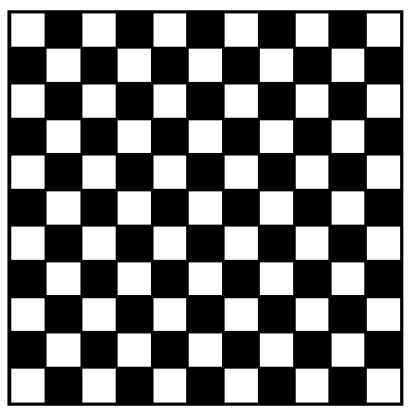
FIGS. 13A and 13B are views for explaining an image recovery filter according to the second embodiment.
Figure 13B:
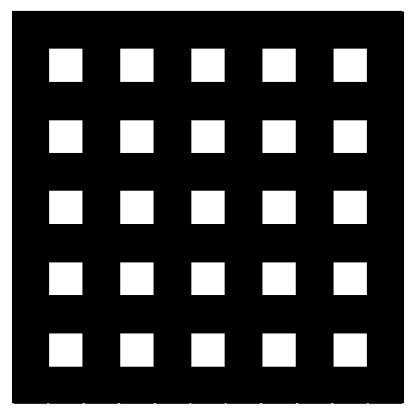

FIGS. 13A and 13B show an example of an image recovery filter to be applied to a RAW image in the Bayer arrangement in the second embodiment. This is an image recovery filter which holds a coefficient corresponding to only a color component signal corresponding to any one of filter colors for each pixel in which a target color component exists. Referring to FIGS. 13A and 13B, each portion holding a coefficient is represented by a white square, and each of the remaining portions holding 0 is represented by a black square. When performing image recovery processing for three color components, that is, R, G, and B components, an image recovery filter to be applied to the G component becomes the one shown in FIG. 13A, and an image recovery filter to be applied to the R and B components becomes the one shown in FIG. 13B.

A saturated portion surrounding region detection unit 1003 then sets a saturated region constituted by saturated pixels and a saturated portion surrounding region in the plane of R, G and B (step S42). As a basic decision method, the flowchart for processing in FIG. 6 or 9 described in the first embodiment or the modification can be used. It is however necessary to take into consideration that a RAW image to be handled has a Bayer arrangement.

Figure 14:
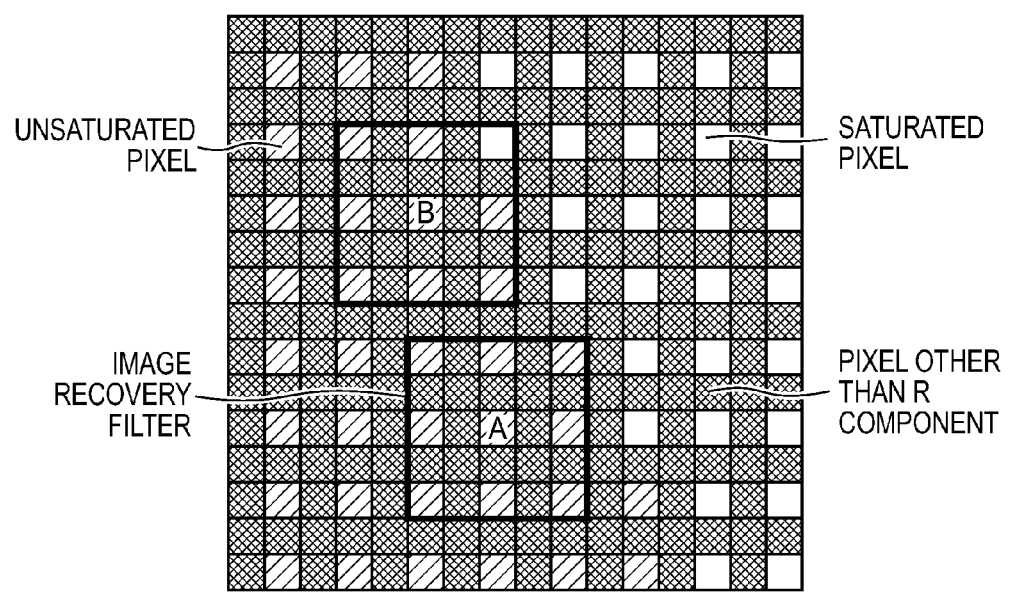
FIG. 14 is a view for explaining a saturated portion surrounding region according to the second embodiment.

A method of setting a saturated portion surrounding region will be described with reference to FIG. 14 showing an example of saturated pixels in a RAW image and an image recovery filter to be used. FIG. 14 shows saturated pixels and unsaturated pixels of R components in a given region of a RAW image. An image recovery filter for generating a recovery signal of a pixel A in FIG. 14 is a 5×5 tap filter, which is used to perform convolution processing for the pixels in the range indicated by the thick frame around the pixel A.

Since this image recovery filter is configured to correspond to only the R components in the Bayer arrangement as described above, no pixels other than the R components are used in convolution processing. Even if the G and B components are used, since a corresponding coefficient is 0, the use of the G and B components has no influence on the result. In the case of the pixel A, no saturated pixel is used when applying an image recovery filter. That is, no ringing due to pixel saturation occurs, and hence the pixel A is not set as a pixel in the saturated portion surrounding region. In the case of a pixel B, a saturated pixel is used when applying the image recovery filter. Therefore, the pixel B is a pixel in the saturated portion surrounding region. A saturated portion surrounding region detection unit 1003 decides a saturated portion surrounding region by performing the above determination for each unsaturated pixel in this manner.

It is possible to specify a saturated portion surrounding region by using no color components other than target color components even for a RAW image with each pixel having one color component upon determining the saturated portion surrounding region in this manner.

A recovery filter application unit 1004 performs convolution processing for each pixel of each color component of the sensed image by using the image recovery filter selected in step S41 (step S43). This can correct aberration asymmetry caused in the optical imaging system or remove or reduce blur components on the image.

After the recovery filter application unit 1004 applies an image recovery filter, a recovery component generating unit 1005 generates recovery components as the differences between pixel values before the application of the image recovery filter and pixel values after the application of the image recovery filter (before and after recovery processing) (step S44). The recovery components in the second embodiment are the same as those in the first embodiment, and hence a description of them will be omitted. An LPF application unit 1006 then applies an LPF to recovery components, of the acquired recovery components, which correspond to pixels in the saturated region and saturated portion surrounding region detected by the saturated portion surrounding region detection unit 1003 (step S45). In this case, the LPF application unit 1006 does not apply the LPF to pixels other than those in the saturated region and saturated portion surrounding region. A recovery component synthesizing unit 1007 then respectively synthesizes the recovery components with the pixel values of the input RAW image (step S46). In this case, equations (12) and (13) indicate an example of how the LPF application unit 1006 and the recovery component synthesizing unit 1007 apply the LPF to the pixels in the saturated region and the saturated portion surrounding region and synthesize recovery components. In equation (12), Rd'(x, y) represents a recovery component after the application of the LPF, and R2(x, y) represents an R pixel value after recovery component synthesis.

$$Rd'(x, y) = \qquad (12)$$
$$\{4 \times Rd(x, y) + 2 \times (Rd(x, y-2) + Rd(x-2, y) + Rd(x+2, y) +$$
$$Rd(x, y+2)) + (Rd(x-2, y-2) + Rd(x+2, y-2) +$$
$$Rd(x-2, y+2) + Rd(x+2, y+2))\}/16$$

$$R2(x, y) = R0(x, y) + Rd'(x, y) \qquad (13)$$

Although the above is an example of how image recovery processing is applied to an R component, the same processing can be applied to G and B components.

In addition, as for a region other than the saturated region and the saturated portion surrounding region, it is possible to obtain pixel values after the application of the image recovery filter by synthesizing the pixel values of the respective pixels before the application of the image recovery filter with recovery components which are the differences between pixel values before and after the application of the image recovery filter.

As described above, it is possible to reduce ringing by applying the LPF to recovery components of pixels in a saturated region and saturated portion surrounding region of a RAW image with each pixel having one color component by not using color components other than a target color component.

A pixel interpolation unit 1001 performs pixel interpolation processing for the RAW image, to which the image recovery filter has been applied to reduce ringing, to make each pixel have color component signals corresponding to all the filter colors, thereby generating three color planes, that is, R, G, and B planes (step S47).

Performing the processing described above with reference to FIG. 12 will terminate the image recovery processing in the image recovery processing unit 110.

Since the OTF changes in accordance with the image height of the optical imaging system even in one image sensing state, it is preferable to perform the image recovery processing upon changing the OTF for each segmented region of the image in accordance with the image height. It is possible to achieve this by scanning an image recovery filter on an image while performing convolution processing and sequentially changing the filter for each region. That is, an image recovery filter for each pixel of each color component is selected or generated in step S41, and recovery processing is performed for each pixel of each color component in step S43. In addition, although the application of image recovery filters is taken as image recovery processing in the second embodiment, it is possible to take other types of processing such as distortion correction processing, peripheral light amount correction processing, and noise reduction processing before, after, and during the procedure of the present invention and handle the resultant procedure as image recovery processing.

According to the above description made with reference to FIGS. 11 and 12, recovery components are generated for both the pixels in a saturated region and a saturated portion surrounding region and synthesizes them with the pixel values before the application of an image recovery filter. However, the present invention is not limited to this example. The present invention may output pixel values after the application of an image recovery filter without any change as the pixel values of pixels other than those in the saturated region and the saturated portion surrounding region as long as it is possible to synthesize recovery components of the pixels in the saturated region and the saturated portion surrounding region, which have undergone LPF processing, with the pixel values before the application of the image recovery filter.

The above embodiment has exemplified the case in which a saturated region and a saturated portion surrounding region are set from pixel values before the application of an image recovery filter, and LPF processing is applied for only recovery components in the saturated region and saturated portion surrounding region. However, the present invention is not limited to this. An LPF may be applied to not only recovery components in the saturated region and saturated portion surrounding region but also recovery components outside the regions. In such instances the pixel values of the respective pixels outside the regions before the application of the image recovery filter are synthesized with the values obtained by weighting and adding recovery components before the application of the LPF and recovery components after the application of the LPF. At this time, as the distances from the saturated region and the saturated portion surrounding region increase, weights for recovery components before the application of the LPF are increased, and weighted addition of the recovery components and recovery components after the application of the LPF is performed. This can make gradual changes from a region where LPF processing is applied to recovery components to a region where the LPF processing is not applied to recovery components. However, in a region where the effect of image recovery is reduced the weights are larger for the recovery components after the application of an LPF. For this reason, it is preferable to set, as a limit region, a region predetermined relatively short distances from a saturated region and a saturated portion surrounding region, and to set a weighting coefficient so as to assign a weight of 0 to each recovery component in the limit region after the application of an LPF.

In the above embodiments, a saturated region and a saturated portion surrounding region which are set based on pixel values before the application of an image recovery filter are specific regions where LPF processing is applied to recovery components. However, it is possible to use a different method to decide specific regions where LPF processing is applied to recovery components. A region where ringing has occurred due to the application of an image recovery filter includes both a region where recovery components abruptly increase and a region where recovery components abruptly decrease. As a result, the values of the recovery components take a shape of a hill or valley, as shown in FIG. 5C. For this reason, upon applying an image recovery filter to the entire region of the image a region which is adjacent or near regions where the gradients of recovery components are equal to or more than a threshold and have opposite directions and is surrounded by the adjacent or near regions in which the difference between the maximum and minimum values of recovery components is equal to or more than a threshold is given as a ringing occurrence region. Pixels to be used when an image recovery filter is applied to this ringing region, with a pixel located in an end portion of the region being the center, may be set as a pixel in a ringing surrounding region. LPF processing may be applied to recovery components in the ringing region and ringing surrounding region as specific regions. In addition, in the region where ringing has occurred, the weights for recovery components before the application of an LPF may be increased as the gradient of recovery components is moderate or the difference between the maximum and minimum values of recovery components is small, and may perform weighted addition of them and recovery components after the application of the LPF. This is because it is thought as such conditions are satisfied, ringing becomes less noticeable even if it occurs.

Although the above embodiments have been described by using a general Bayer arrangement constituted by R, G, and B components, the color components in the present invention are not limited to R, G, and B components. The present invention can be applied to a pixel arrangement constituted by a plurality of color components other than R, G, and B components. In addition, the present invention can be applied to various pixel arrangements in image sensors.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2011-209786 filed Sep. 26, 2011 and 2012-194244 filed Sep. 4, 2012, which are hereby incorporated by reference herein in their entirety.

What is claimed is:

1. An image processing apparatus for performing recovery processing of correcting degradation of an image due to an aberration of an optical imaging system with respect to image data obtained by sensing an object image entering through the optical imaging system using an image sensor, comprising:
    a selection unit configured to select a filter to be used for recovery processing in accordance with an image sensing condition at the time of the image sensing;
    an image processing unit configured to perform recovery processing for the image data by using the filter selected by said selection unit; and
    a correction unit configured to determine a correction value based on a difference between the value of a pixel before and after recovery processing by said image processing unit, and correct the pixel value before the recovery processing by said image processing unit using the determined correction value.

2. The apparatus according to claim 1, wherein said correction unit includes
    a difference processing unit configured to smooth the difference between pixel values before and after recovery processing by said image processing unit, and
    a synthesizing unit configured to synthesize the smoothed difference with the pixel value before recovery processing by said image processing unit.

3. The apparatus according to claim 2, wherein said synthesizing unit is configured to output, in the case of a pixel in a specified region, a pixel value obtained by synthesizing the smoothed difference with a pixel value before recovery processing by said image processing unit, and output, in the case of a pixel outside the specified region, a pixel value obtained by synthesizing the difference which is not smoothed with a pixel value before recovery processing by said image processing unit.

4. The apparatus according to claim 3, further comprising a setting unit configured to set a specified region comprising a saturated region comprising a determined saturated pixel, and a surrounding region of the saturated region determined based on a position of the determined saturated pixel and a characteristic of a filter selected by said selection unit.

5. The apparatus according to claim 2, wherein said synthesizing unit is configured to output, in the case of a pixel in a specific region, a pixel value obtained by synthesizing the smoothed difference with a pixel value before recovery processing by said image processing unit, and output, in the case of a pixel outside the specific region, a pixel value after recovery processing by said image processing unit.

6. The apparatus according to claim 5, further comprising a setting unit configured to set a specified region comprising saturated region comprising a determined saturated pixel, and a surrounding region of the saturated region determined based on a position of the determined saturated pixel and a characteristic of a filter selected by said selection unit.

7. The apparatus according to claim 6, wherein said setting unit is configured to determine, in the recovery processing for a pixel other than the saturated pixel, the surrounding region by determining a pixel, used by the filter, other than the saturated pixel as a pixel in the surrounding region when the filter uses a pixel value of the saturated pixel in the recovery processing.

8. The apparatus according to claim 6, wherein said setting unit is configured to set, in the recovery processing for the saturated pixel, the surrounding region by determining a pixel other than the saturated pixel used by the filter as a pixel in the surrounding region, when the filter uses a pixel value of a pixel other than the saturated pixel in the recovery processing.

9. The apparatus according to claim 1, wherein each pixel of the image sensor is covered with any of a plurality of color filters of a plurality of colors, and
    the image processing apparatus further comprises a pixel interpolation unit configured to perform interpolation processing for respective image data of the plurality of colors so as to make the pixels have image data of the respective plurality of colors, and
    said image processing unit performs the recovery processing for image data having undergone the interpolation processing.

10. The apparatus according to claim 1, wherein each pixel of the image sensor is covered with any of a plurality of color filters of a plurality of colors, and
    the image processing apparatus further comprises a pixel interpolation unit configured to perform interpolation processing for image data of the respective plurality of colors corrected by said correction unit so as to make the pixels have image data of the respective plurality of colors.

11. The apparatus according to claim 1, wherein the filter used by said image processing unit comprises a two-dimensional filter characterizing an inverse Fourier transform of a function generated based on an inverse function of an optical transfer function of an optical element of the optical imaging system, and
    said image processing unit performs convolution processing of the filter.

12. An image processing method for performing recovery processing of correcting degradation of an image due to an aberration of an optical imaging system with respect to image data obtained by sensing of an object image incident through the optical imaging system using an image sensor, comprising:
    a selection step of selecting a filter to be used for recovery processing in accordance with an image sensing condition at the time of the image sensing;
    an image processing step of performing recovery processing for the image data by using the filter selected in the selection step; and
    a correction step of determining a correction value based on a difference between the value of a pixel before and after recovery processing of the image processing step, and correcting the pixel value before the recovery processing of the image processing step by using the determined correction value.

13. A non-transitory computer-readable storage medium storing a program for causing a computer to perform recovery processing of correcting degradation of an image due to an aberration of an optical imaging system with respect to image data obtained by sensing of an object image incident through the optical imaging system using an image sensor, by performing a selection step of selecting a filter to be used for recovery processing in accordance with an image sensing condition at the time of the image sensing;

an image processing step of performing recovery processing for the image data by using the filter selected in the selection step; and a correction step of determining a correction value based on a difference between the value of a pixel before and after recovery processing of the image processing step, and correcting the pixel value before the recovery processing of the image processing step by using the determined correction value.

* * * * *